US012777277B2

(12) United States Patent
Wood, Jr.

(10) Patent No.: US 12,777,277 B2
(45) Date of Patent: Oct. 27, 2026

(54) STERILIZED COVER SYSTEM

(71) Applicant: James Wood, Jr., Medford, NY (US)

(72) Inventor: James Wood, Jr., Medford, NY (US)

( * ) Notice: Subject to any disclaimer, the term of this patent is extended or adjusted under 35 U.S.C. 154(b) by 148 days.

(21) Appl. No.: 18/761,464

(22) Filed: Jul. 2, 2024

(65) Prior Publication Data

US 2026/0012724 A1 Jan. 8, 2026

(51) Int. Cl.
*H04R 1/12* (2006.01)

(52) U.S. Cl.
CPC .................................... *H04R 1/12* (2013.01)

(58) Field of Classification Search
None
See application file for complete search history.

(56) References Cited

U.S. PATENT DOCUMENTS 2,593,382 A * 4/1952 Zimmermann .......... H04R 1/12 379/439
5,054,063 A * 10/1991 Lo ............................ H04R 1/12 379/439
5,862,215 A 1/1999 Garriette
5,930,356 A 7/1999 Harrison
D430,561 S 9/2000 McNair
6,215,871 B1 * 4/2001 Conolly .................. H04R 1/12 379/439
6,560,335 B2 5/2003 Zohn
2002/0025033 A1 2/2002 Vernon
2003/0012371 A1 1/2003 Weinstock
2003/0086563 A1 5/2003 Lashley
2003/0112371 A1 6/2003 Tai
2003/0219116 A1 * 11/2003 Hudgins .................. H04R 1/12 379/451
2005/0254643 A1 11/2005 Hall

FOREIGN PATENT DOCUMENTS

WO WO02062041 8/2002

* cited by examiner

*Primary Examiner* — Hemant S Patel

(57) ABSTRACT

A sterilized cover system for covering an earpiece and a mouthpiece of a telephone to inhibit transmission of microorganisms between a user and the telephone includes a telephone having an earpiece and a mouthpiece. A cover is removably couplable to the telephone to covers at least one of the earpiece and the mouthpiece and inhibit transmission of a microorganism between a user and the telephone. The cover may include a first layer having an outer side and an inner side. The cover may also include a second layer that is coupled to the inner side. A band is coupled to an outer edge of the first and second layers. The band has an interior lateral edge abutting the second layer. The cover is resiliently deformable whereby a surface area of the cover is expandable such that the cover can cover at least one of the earpiece and the mouthpiece.

11 Claims, 5 Drawing Sheets

STERILIZED COVER SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to protective covers and more particularly pertains to a new protective cover for covering an earpiece and a mouthpiece of a telephone to inhibit transmission of microorganisms between a user and the telephone.

(2) Description of Related Art Including Information Disclosed Under 37 CFR 1.97 and 1.98

The prior art relates to protective covers. These protective covers can be placed over a device to inhibit transmission of microorganisms between a user and the device. However, few of these protective covers have been adapted for use with telephones. Particularly when telephones are shared between various users, the earpieces and mouthpieces can harbor numerous germs, bacteria, and other microorganisms. Transmission of these microorganisms can cause illness and disease to spread between the users who are sharing the telephone. Thus, there is a need in the art for a protective cover that can be removably coupled to an earpiece and a mouthpiece of a telephone to inhibit transmission of microorganisms between the telephone and the user. There is also a need in the art for a protective cover that can provide a sanitary barrier between the user and the telephone without inhibiting the transfer of sound to or from the user while using the telephone. Finally, there is a need in the art for a protective cover that can be used on various different types of telephones, and which the user can easily carry with them for use during a phone call.

BRIEF SUMMARY OF THE INVENTION

An embodiment of the disclosure meets the needs presented above by generally comprising a telephone having an earpiece and a mouthpiece. A cover is removably couplable to the telephone. The cover covers at least one of the earpiece and the mouthpiece whereby the cover is configured to inhibit transmission of a microorganism between a user and the telephone. The cover may include a first layer having an outer side and an inner side. The first layer may be formed of a paper material including natural fibers, synthetic fibers, and combinations thereof. The cover may also include a second layer that is coupled to the inner side. The second layer may be formed of a woven fabric material. A band is coupled to an outer edge of the first and second layers. For example, the band may have an interior lateral edge abutting the second layer and an exposed exterior lateral edge. Each of the first and second layers and the band is resiliently deformable whereby a surface area of the cover is expandable such that the cover can cover at least one of the earpiece and the mouthpiece.

There has thus been outlined, rather broadly, the more important features of the disclosure in order that the detailed description thereof that follows may be better understood, and in order that the present contribution to the art may be better appreciated. There are additional features of the disclosure that will be described hereinafter, and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
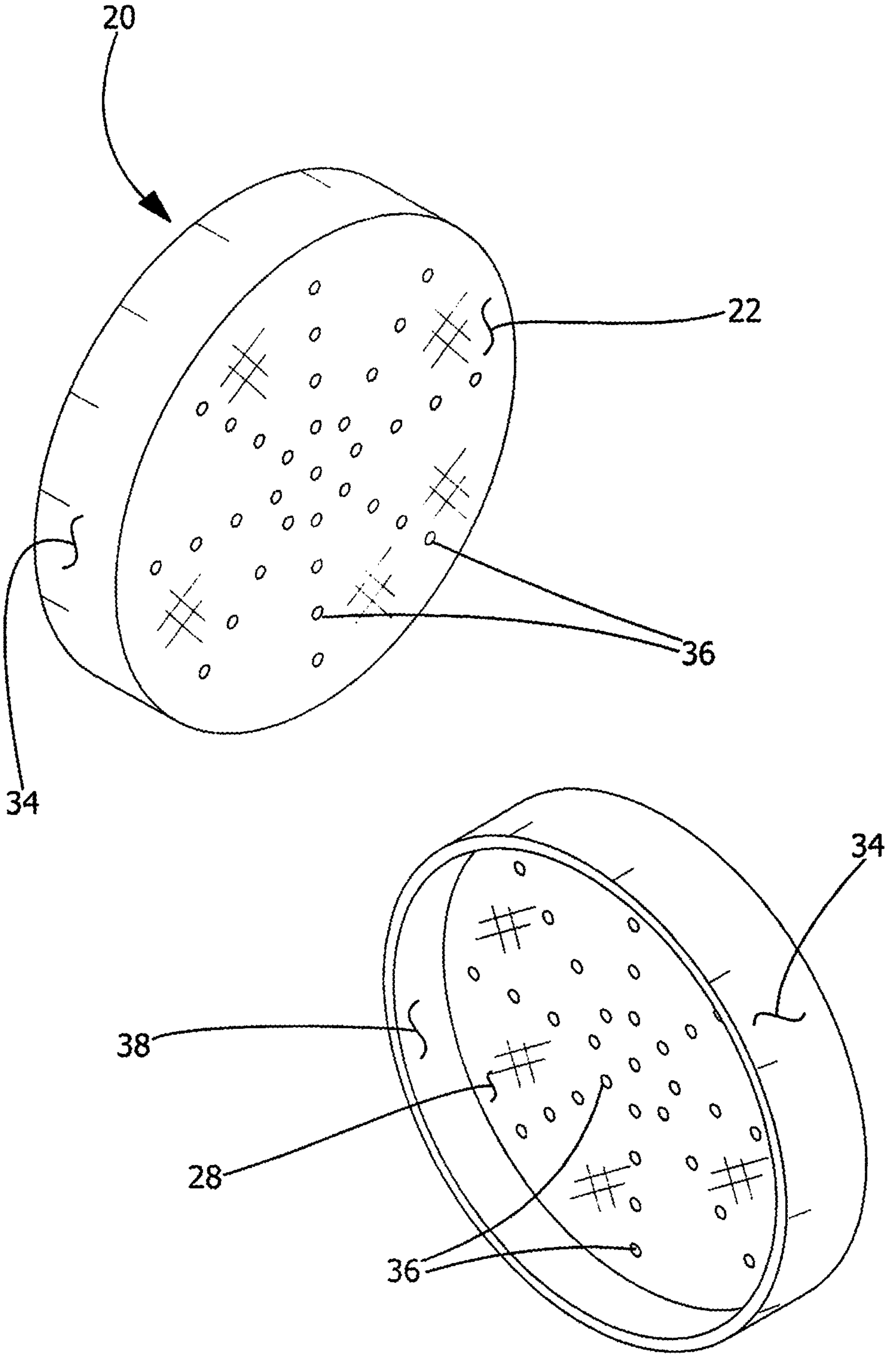
FIG. 1 is an isometric view of a sterilized cover system according to an embodiment of the disclosure.

With reference now to the drawings, and in particular to FIGS. 1 through 5 thereof, a new protective cover embodying the principles and concepts of an embodiment of the disclosure and generally designated by the reference numeral 10 will be described.

As best illustrated in FIGS. 1 through 5, the sterilized cover system 10 generally comprises a telephone 23 having an earpiece 14 and a mouthpiece 16. A cover 20 is removably couplable to the telephone 23. When coupled to the telephone, the 20 cover covers at least one of the earpiece 14 and the mouthpiece 16 whereby the cover 20 is configured to inhibit transmission of a microorganism between a user 18 and the telephone 12. Embodiments of the cover 20 may be sterilized or configured for disposal after a single use.

The cover 20 may comprise a first layer 22 having an outer side 24 and an inner side 26. The first layer 22 may comprise a paper material including natural fibers, synthetic fibers, and combinations thereof. In some embodiments, the first layer 22 may be scented. Embodiments of the first layer 22 may also be disc shaped.

The cover may further comprise a second layer 28 that is coupled to the inner side 26 of the first layer 22. Particularly in embodiments where the first layer 22 is disc shaped, the second layer 28 may also be disc shaped. The second layer 28 may comprise a woven fabric material such as a gauze padding.

The first layer 22 generally has a diameter that is greater than a diameter of the second layer 28. The first layer 22 may be concentrically positioned with the second layer 28 wherein a perimeter edge 30 of the second layer 28 is inset from a peripheral edge 32 of the first layer 26. A peripheral wall 34 may extend from the first layer 22. Generally, the peripheral wall 34 has a thickness equivalent to a thickness of the inset of the perimeter edge 30 of the second layer 28 from the peripheral edge 32 of the first layer 22. An example of such embodiments is provided in FIG. 3.

Figure 3:
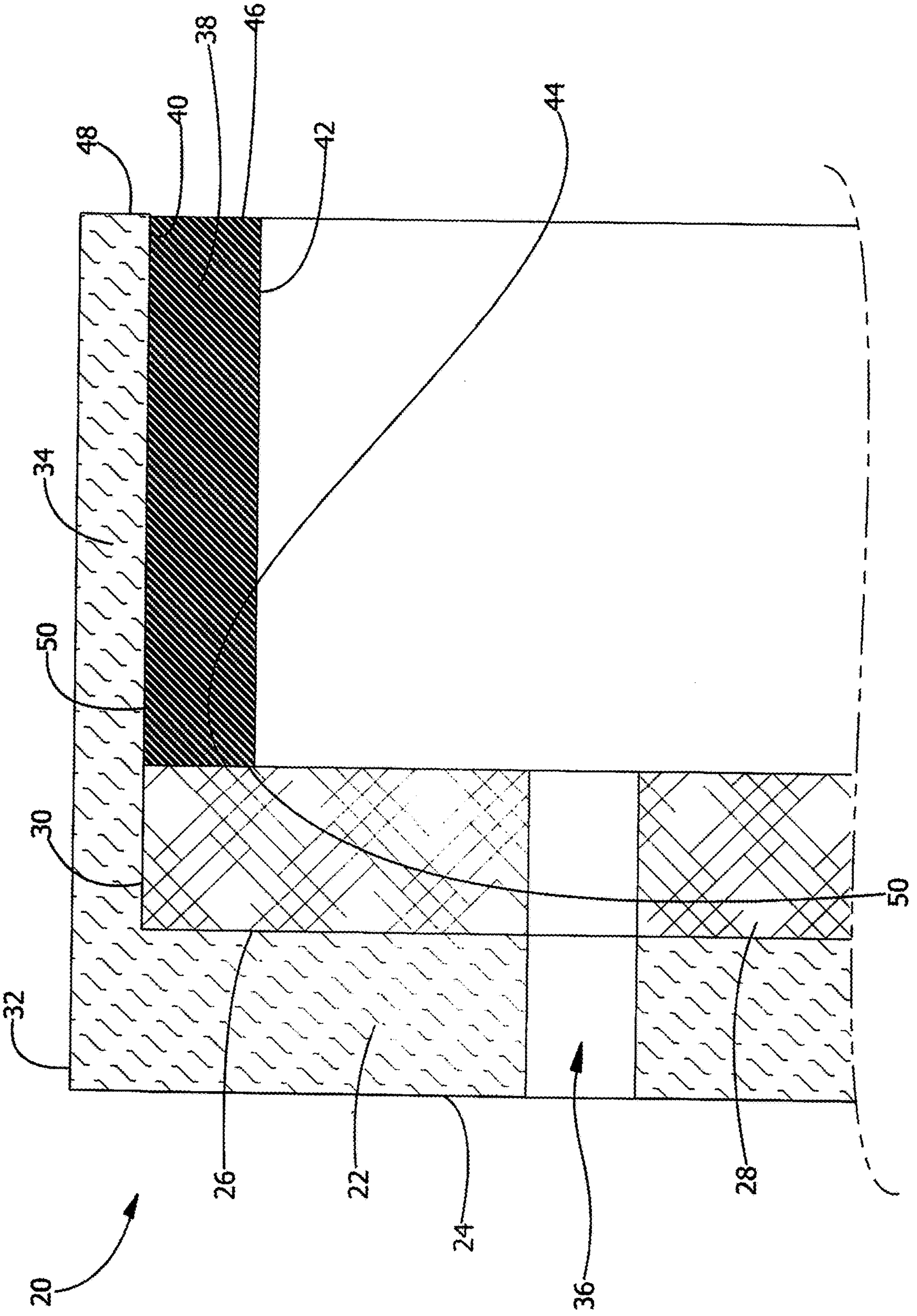
FIG. 3 is a cross-sectional view of an embodiment of the disclosure.

The first 22 and second 28 layers may each have a plurality of apertures 36 extending therethrough. The plurality of apertures 36 in the first layer 22 may be aligned with the plurality of apertures 36 in the second layer 28, as shown in FIG. 3. In other embodiments, the plurality of apertures 36 in the first layer 22 may be offset from the plurality of apertures 36 in the second layer 28. The plurality of apertures 36 are generally configured to facilitate sound transfer through the cover 20 when the cover 20 is coupled to the telephone 12.

A band 38 is generally coupled to an outer edge 50 of the first 22 and second 28 layers. For example, the band 38 may have a top edge 40 that is covered by and coupled to the peripheral wall 32 of the first layer 22. The band 38 may have a bottom edge 42 that is opposite the top edge 40. The band 38 may also have an interior lateral edge 44 abutting the second layer 28 and an exterior lateral edge 46 that is coplanar with a free edge 48 of the peripheral wall 34. In the embodiment shown in FIG. 3, the bottom edge 42 and the exterior lateral edge 46 are both exposed.

Figure 2:
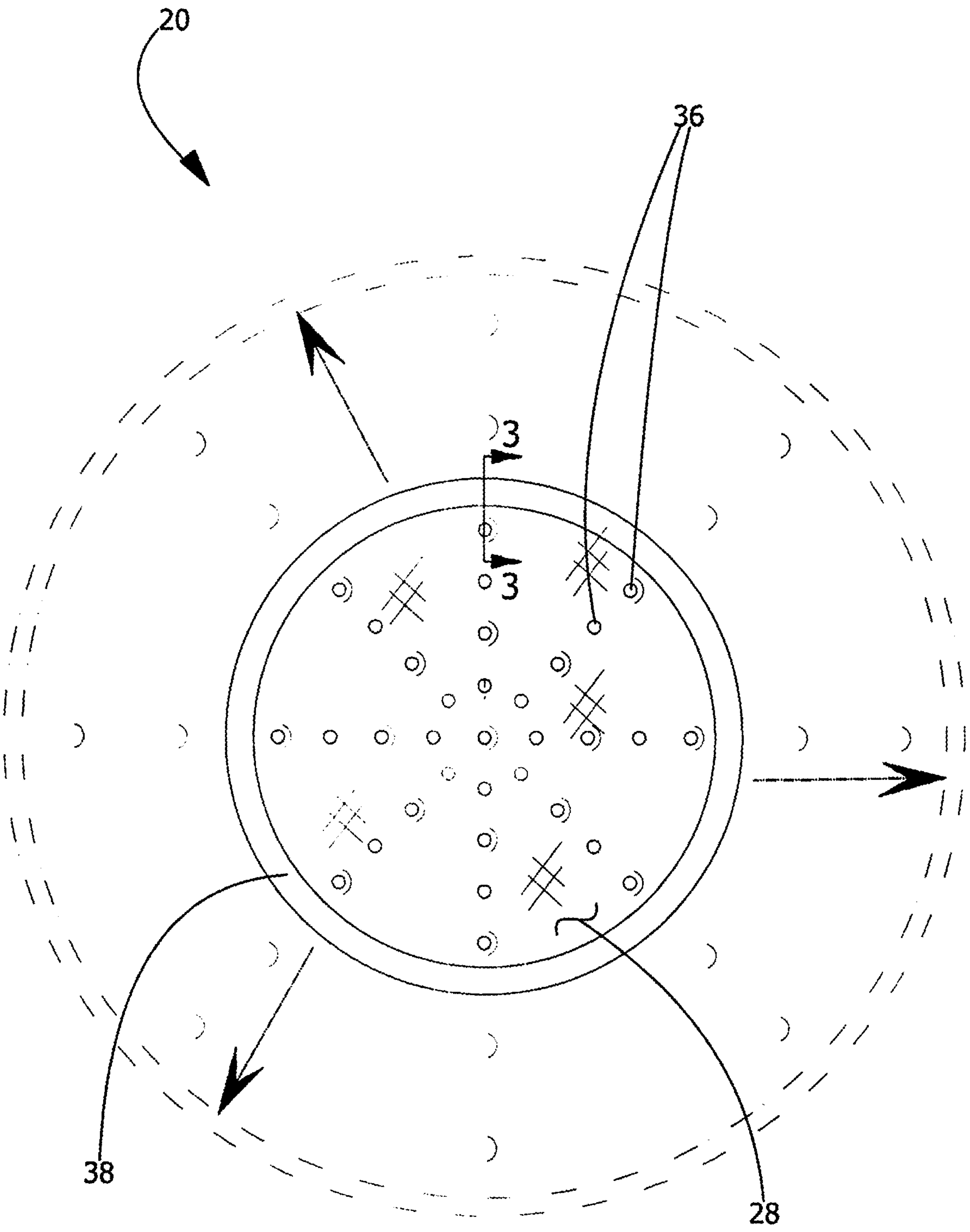
FIG. 2 is a rear view of an embodiment of the disclosure.
Figure 4:
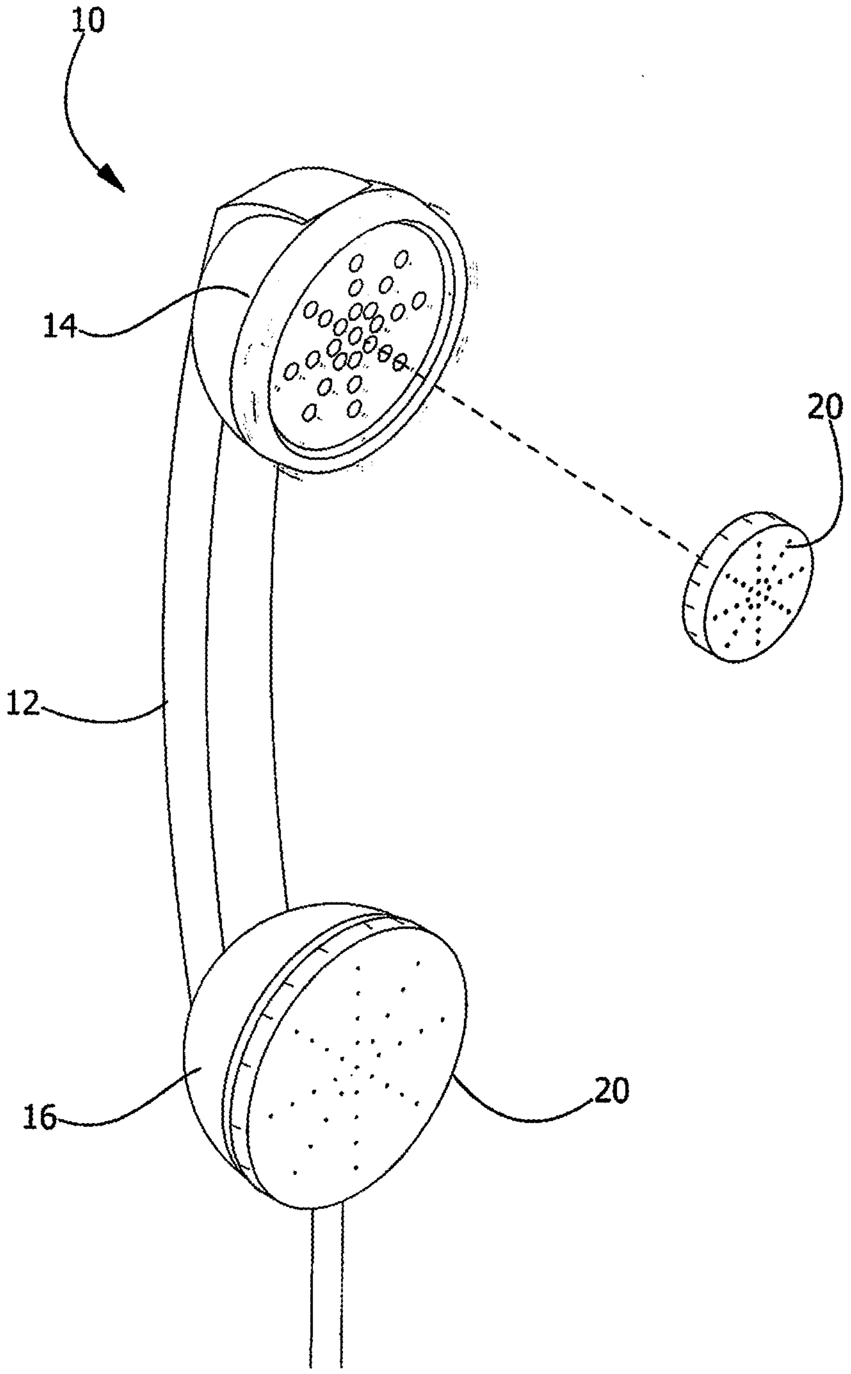
FIG. 4 is an in-use view of an embodiment of the disclosure.

The band 38 may comprise elastic or another resiliently deformable material. In some embodiments, each of the first 22 and second 28 layers and the band 38 is resiliently deformable whereby a surface area of the cover 20 is expandable so that the cover can stretch over at least one of the earpiece 14 and the mouthpiece 16. An example of such embodiments is depicted in FIGS. 2 and 4.

Figure 5:
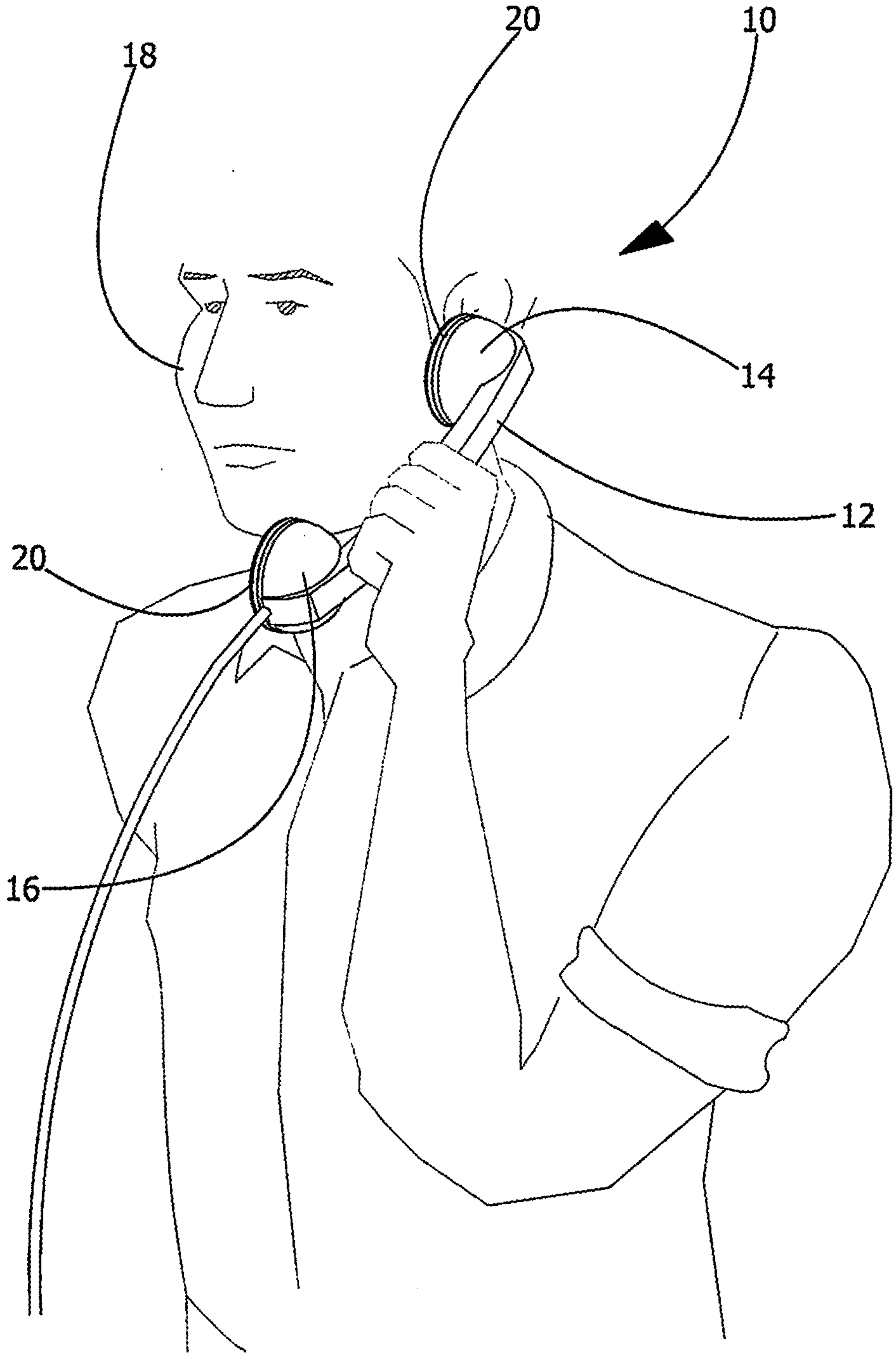
FIG. 5 is an in-use view of an embodiment of the disclosure.

In use, the user 18 can position the cover 20 over the earpiece 14 or the mouthpiece 16. The user 18 can position a cover 20 over each of the earpiece 14 and mouthpiece 16 as shown in FIGS. 4 and 5. The cover 20 can inhibit transference of microorganisms between the telephone 12 and the user 18. Thus, the user 18 is less likely to contract an illness or other disease while using the telephone 12, even if the user 18 is sharing the telephone 12 with other persons.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

The invention claimed is:

1. A sterilized cover system comprising:

a telephone having an earpiece and a mouthpiece;

a cover being removably couplable to the telephone, the cover covering at least one of the earpiece and the mouthpiece whereby the cover is configured to inhibit transmission of a microorganism between a user and the telephone, the cover comprising:

a first layer having an outer side and an inner side, the first layer comprising a paper material including natural fibers, synthetic fibers, and combinations thereof;

a second layer being coupled to the inner side, the second layer comprising a woven fabric material;

the first layer having a diameter greater than a diameter of the second layer;

the first layer being concentrically positioned with the second layer wherein a perimeter edge of the second layer is inset from a peripheral edge of the first layer;

a peripheral wall extending from the first layer, the peripheral wall having a thickness equivalent to a thickness of the inset of the perimeter edge of the second layer from the peripheral edge of the first layer;

a band being coupled to an outer edge of the first and second layers, the band having a top edge being covered by the peripheral wall, the band having a bottom edge opposite the top edge, the band having an interior lateral edge abutting the second layer; and wherein each of the first and second layers and the band is resiliently deformable whereby a surface area of the cover is expandable to cover at least one of the earpiece and the mouthpiece.

2. The sterilized cover system of claim 1, wherein the cover is sterilized.

3. The sterilized cover system of claim 1, wherein the cover is configured for disposal after a single use.

4. The sterilized cover system of claim 1, wherein the first layer is scented.

5. The sterilized cover system of claim 1, wherein each of the first and second layers is disc shaped.

6. The sterilized cover system of claim 1, wherein the woven fabric material is a gauze padding.

7. The sterilized cover system of claim 1, wherein each of the first and second layers has a plurality of apertures extending therethrough, the plurality of apertures being configured to facilitate sound transfer through the cover when the cover is coupled to the telephone.

8. The sterilized cover system of claim 7, wherein the plurality of apertures in the first layer are aligned with the plurality of apertures in the second layer.

9. The sterilized cover system of claim 1, the band further comprising an exterior lateral edge being coplanar with a free edge of the peripheral wall.

10. The sterilized cover system of claim 1, wherein the band is elastic.

11. A sterilized cover system comprising:

a telephone having an earpiece and a mouthpiece;

a cover being removably couplable to the telephone, the cover covering at least one of the earpiece and the mouthpiece whereby the cover is configured to inhibit transmission of a microorganism between a user and the telephone, the cover being sterilized, the cover being configured for disposal after a single use, the cover comprising:

a first layer having an outer side and an inner side, the first layer comprising a paper material including natural fibers, synthetic fibers, and combinations thereof, the first layer being scented, the first layer being disc shaped;

a second layer being coupled to the inner side, the second layer being disc shaped, the second layer comprising a woven fabric material, the woven fabric material being a gauze padding;

the first layer having a diameter greater than a diameter of the second layer;

the first layer being concentrically positioned with the second layer wherein a perimeter edge of the second layer is inset from a peripheral edge of the first layer;

a peripheral wall extending from the first layer, the peripheral wall having a thickness equivalent to a thickness of the inset of the perimeter edge of the second layer from the peripheral edge of the first layer;

the first and second layers having a plurality of apertures extending therethrough, the plurality of apertures in the first layer being aligned with the plurality of apertures in the second layer, the plurality of apertures being configured to facilitate sound transfer through the cover when the cover is coupled to the telephone;

a band being coupled to an outer edge of the first and second layers, the band having a top edge being covered by the peripheral wall, the band having a bottom edge opposite the top edge, the band having an interior lateral edge abutting the second layer, the band having an exterior lateral edge being coplanar with a free edge of the peripheral wall, the bottom edge and the exterior lateral edge being exposed, the band being elastic; and wherein each of the first and second layers and the band is resiliently deformable whereby a surface area of the cover is expandable to cover at least one of the earpiece and the mouthpiece.

* * * * *